(12) United States Patent
Wats

(10) Patent No.: US 12,691,648 B2
(45) Date of Patent: Jul. 28, 2026

(54) STRUCTURAL SHELL

(71) Applicant: COEUS LIMITED, Douglas Isle of Man (GB)

(72) Inventor: Hendrik Johannes Wats, Douglas Isle of Man (GB)

(73) Assignee: COEUS LIMITED, Douglas Isle of Man (GB)

( * ) Notice: Subject to any disclaimer, the term of this patent is extended or adjusted under 35 U.S.C. 154(b) by 505 days.

(21) Appl. No.: 18/036,516

(22) PCT Filed: Oct. 26, 2021

(86) PCT No.: PCT/EP2021/079705
§ 371 (c)(1),
(2) Date: May 11, 2023

(87) PCT Pub. No.: WO2022/101003
PCT Pub. Date: May 19, 2022

(65) Prior Publication Data
US 2024/0009941 A1     Jan. 11, 2024

(30) Foreign Application Priority Data

Nov. 11, 2020     (GB) .................................... 2017801

(51) Int. Cl.
| | | |
|---|---|---|
| *B29C 70/42* | (2006.01) | |
| *B29C 37/00* | (2006.01) | |
| *B29C 70/00* | (2006.01) | |
| *B29C 70/14* | (2006.01) | |
| *B29C 70/68* | (2006.01) | |
| *B29C 70/70* | (2006.01) | |

(Continued)

(52) U.S. Cl.
CPC .......... *B29C 70/42* (2013.01); *B29C 37/0067* (2013.01); *B29C 70/003* (2021.05); *B29C 70/14* (2013.01); *B29C 70/681* (2013.01); *B29C 70/70* (2013.01); *B29K 2033/08* (2013.01); *B29K 2309/14* (2013.01); *B29K 2667/003* (2013.01); *B29L 2031/307* (2013.01)

(58) Field of Classification Search
CPC .... B32B 5/02; B32B 5/12; B32B 5/24; B32B 5/26; B32B 19/02; B32B 19/04; B32B 19/06; B29C 70/42; B29C 37/0067; B29C 70/003; B29C 70/14; B29C 70/681
See application file for complete search history.

(56) References Cited

U.S. PATENT DOCUMENTS

| | | | | |
|---|---|---|---|---|
| 11,624,347 B2 * | 4/2023 | Bozsak | .............. | B29D 99/0028 |
| | | | | 416/241 A |
| 2010/0285269 A1 | 11/2010 | Telander | | |

(Continued)

FOREIGN PATENT DOCUMENTS

| | | |
|---|---|---|
| CN | 103044877 A | 4/2013 |
| CN | 106893038 A | 6/2017 |

(Continued)

*Primary Examiner* — Philip J Bonzell
(74) *Attorney, Agent, or Firm* — Carmody Torrance Sandak & Hennessey LLP

(57) ABSTRACT

The present invention provides a structural shell comprising a basalt fibre-reinforced material, wherein the basalt fibre-reinforced material comprises a polymer material, the polymer material being capable of at least partially thermally cracking at a temperature of from 200 to 600° C.

16 Claims, 6 Drawing Sheets

(51) Int. Cl.

| | | |
|---|---|---|
| *B29K 33/00* | (2006.01) | |
| *B29K 309/00* | (2006.01) | |
| *B29K 667/00* | (2006.01) | |
| *B29L 31/30* | (2006.01) | |

(56) References Cited

U.S. PATENT DOCUMENTS

| | | |
|---|---|---|
| 2011/0254189 A1 | 10/2011 | Doyle et al. |
| 2012/0164900 A1 | 6/2012 | Reichwein et al. |
| 2020/0018283 A1 | 1/2020 | Bozsak et al. |
| 2020/0024795 A1 | 1/2020 | Gurijala et al. |
| 2020/0047427 A1 | 2/2020 | Bozsak et al. |
| 2021/0237317 A1* | 8/2021 | Dubois .................. C10B 49/00 |

FOREIGN PATENT DOCUMENTS

| | | |
|---|---|---|
| CN | 106995533 A | 8/2017 |
| CN | 107915937 A | 4/2018 |
| CN | 108504017 A | 9/2018 |
| CN | 110612392 A | 12/2019 |
| JP | 2012505089 A | 3/2012 |
| WO | 2019066028 A1 | 4/2019 |
| WO | 2019207259 A1 | 10/2019 |

* cited by examiner

0°
+45°
-45°
90°
-45°
+45°
0°

STRUCTURAL SHELL

The present invention relates to a recyclable structural shell for a hull, structural grid and/or deck for a marine vessel or a wind turbine blade and the like, a method of manufacturing a structural shell and a method of disassembling a structural shell.

Yacht hulls are typically formed of fibre-reinforced resins, typically fiberglass and/or carbon fibre. Such fibre-reinforced resins are strong, light weight and easy to mould into the shape of, for example, a deck, a hull or a bulk head. Despite the green image of yachting, the majority of the yachting industry is in a status-quo toward sustainability. The two biggest threats are: (i) the use of toxic resins and fiberglass and (ii) that there is no real solution at the end of life of the boat shell.

Although greener solutions with sustainable materials are pointing in the right direction, at the end of life it only allows down cycling where the end product inevitably ends up in landfill. One reason for this is that the glass and/or carbon fibres used, which have desirable physical and mechanical properties, enable a strong bond to be formed with the resin by being porous and absorbing some of the resin into the glass and/or carbon fibre. Although this provides a strong, lightweight composite that can be used in boat hulls and the like, this means that at present the glass and/or carbon fibres are essentially "single use", and cannot be recycled at the end of life. Moreover, it is common to use the glass and/or carbon fibres to reinforce thermoset plastics for such applications. Thus, at the end of life of the boat hull or the like, there are few options for disposal other than landfill, particularly for the impregnated glass and/or carbon fibres. Down-cycling of some of the material may be possible.

New "green" composites have been developed using flax (hemp), for example. However, these fibres also tend to absorb the resins used in the composites meaning that material separation at end of life is not possible, and the materials can only be down-cycled.

Basalt fibres have been investigated as an alternative "green" fibre for such applications, such as use in yachts, but usually only using vinylester, polyester or (green) epoxy resins. These resins are all thermoset plastics which means the resins turn from liquid to rigid during the production process but cannot get back to liquid. The basalt fibres therefore cannot easily be recovered and reused and/or recycled. Thus, it is likely that much of the composite becomes "single use" and ends up in landfill.

KR20190079109A discloses a method of fabrication of a composite for a boat comprising basalt fibres, and a boat fabricated using the same. However, the composite is made using a resin including a polyester and a curing agent including methyl ketone peroxide, thereby providing a strong thermoset plastic. Thus, as described above, the basalt fibres cannot easily be recovered and the composite can generally only be down-cycled at end of life, at best. Recycling of the composite is not described.

CN109370186 A relates to a production method of a low-temperature-resistant and environment-friendly glass fiber-reinforced plastic septic tank. CN111098528 A relates to a system for producing a fully impregnated thermoplastic prepreg. US 2019/330432 A relates to a two-component hybrid matrix system made of polyurethanes and polymethacrylates for the production of short-fibre-reinforced semifinished products. US 2020/047427 A relates to a process for manufacturing thermoplastic polymer composite parts, and an object obtained by said process. WO 2020/088173 A1 relates to a porous composite material capable of generating an electric arc in a microwave field, a preparation method therefor, and use thereof. JPH11335929 A relates to a highly electroconductive carbon fiber and its production. JP 2003012857 A relates to a treatment method for a waste fiber-reinforced plastic material and a treatment apparatus.

Accordingly, there is a need to provide a structural shell that can be substantially recycled at the end of its life, particularly when used in marine vessels, but also outside of the marine sector. In particular, there is a need to provide a structural shell comprising a fibre-reinforced resin, wherein both the fibres and the resin can be recovered and re- or down-cycled without significant deterioration in their physical and mechanical properties, preferably with substantially no deterioration in their physical and/or mechanical properties.

A further object of the present disclosure is to provide such a substantially recyclable structural shell, wherein the structural shell has high flexural strength per unit area.

The present invention seeks to tackle at least some of the problems associated with the prior art or at least to provide a commercially acceptable alternative solution thereto.

The present invention provides a structural shell, a hull for a marine vessel, a structural grid for a marine vessel, a deck for a marine vessel, a marine vessel, a wind turbine blade, a ski and/or ski pole, a method of manufacturing a structural shell and a method of disassembling a structural shell according to the claims appended hereto.

Specifically, in one aspect the present invention provides a structural shell comprising a basalt fibre-reinforced material, wherein the basalt fibre-reinforced material comprises a polymer material, the polymer material being capable of at least partially thermally cracking at a temperature of from 200 to 600° C.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "structural shell" as used herein may comprise a laminar sheet or layer of material having a thickness significantly smaller than a major surface area. The structural shell may therefore be a thin walled body. The structural shell may be for withstanding external loads, such as fluid pressure, aerodynamic loads and/or impacts, applied to the major surface area of the material. In particular, the structural shell may be a hull and/or deck of a marine vessel, a blade of a wind turbine, ski and/or ski pole, a fuselage of an aircraft, a body of a land vehicle and the like. The structural shell may be supported by a frame.

The term "basalt fibre" as used herein may encompass a material made from extremely fine fibres of basalt, which is composed of the minerals plagioclase, pyroxene, and olivine. The basalt fibres may be manufactured by a method comprising melting bulk basalt, homogenising the basalt and extracting the fibres by extrusion of the molten basalt, for example. Preferably, basalt of high acidity (over 46% silica content) and low iron content is used for the manufacture of the basalt fibres. Typically, the bulk basalt is crushed and washed before melting. The basalt fibres typically have a filament diameter of between 10 and 20 µm.

The term "fibre-reinforced material" as used herein may encompass a composite material reinforced with fibres. The basalt fibre-reinforced material comprises a polymer material. Typically, therefore, the composite material comprises a polymer matrix reinforced with basalt fibres.

The polymer material is capable of at least partially thermally cracking at a temperature of from 200 to 600° C. The term "thermally cracking" as used herein may encompass pyrolysis of the polymer material by depolymerisation and/or removal of crosslinks in the polymer material, for example. Without wishing to be bound by theory, it is understood that the polymers in the polymer material at least partially depolymerise due to the homolytic fission of carbon-carbon bonds in the polymer backbone of the polymers during the thermal cracking. In other words, in some embodiments, for example, the polymer material is capable of at least partially depolymerising and/or un-crosslinking at a temperature of from 200 to 600° C.

Preferably, the polymer material is a thermoplastic material. The thermoplastic material may be a thermoplastic, or a material which exhibits the properties of a thermoplastic. The term "thermoplastic" as used herein may encompass a material which becomes softer when heated and harder when cooled, as defined in the art.

Preferably, the polymer material of the present invention comprises a polymethacrylate, more preferably a poly(methyl methacrylate). A commercially available polymethacrylate that is particularly suitable for use in the present invention is Elium® from Arkema. The polymer material may comprise other (thermoplastic) polymers, such as, for example, other polyacrylates, polyethylene, polypropylene, polyvinyl chloride, polystyrene, polyamides, polyesters, and polyurethanes, polyetherether ketones, liquid crystalline polymers, polysulfones, and polyphenylene sulfide, provided that the polymer material is capable of at least partially thermally cracking at a temperature of from 200 to 600° C.

The Inventor has surprisingly found that the use of basalt fibres to reinforce a material comprising a polymer material, wherein the polymer material is capable of at least partially thermally cracking at a temperature of from 200 to 600° C., enables a structural shell to be manufactured with high flexural strength per unit area for use in a hull for a marine vessel and the like, wherein the basalt fibres are recoverable at end of life, without substantial, or preferably any, deterioration in physical and/or mechanical properties of the basalt fibres. The polymer material and/or resin used to manufacture the polymer material is also recoverable on heating. Without wishing to be bound by theory, it is thought that this is because the basalt fibres have a melting temperature of about 1500° C. or greater. Accordingly, the resulting at least partially thermally cracked polymer material and/or the basalt fibres may be independently recovered from the heated structural shell. Without wishing to be bound by theory, it is also thought that this is because the basalt fibres absorb substantially no resin, preferably no resin. Thus, the basalt fibre-reinforced material can be heated to at least partially thermally crack the polymer material, thereby forming a liquid from which the basalt fibres can be recovered. It is further thought that the bond formed between the polymer material and the basalt fibres is broken when the polymer material is at least partially thermally cracked, thereby enabling the basalt fibres to be separated from the at least partially thermally cracked polymer material with substantially no polymer material residue remaining on the basalt fibres. Thus, the recovered basalt fibres may be recovered without substantial, or preferably any, deterioration in physical and/or mechanical properties. This may enable the basalt fibres to be fully recycled for use in a further structural shell or the like, for example. Preferably, the at least partially thermally cracked polymer material is a liquid at 20° C., i.e. room temperature. This property may enable the basalt fibres and the at least partially thermally cracked polymer material to be more easily separated. For example, this property may enable the basalt fibres and the at least partially thermally cracked polymer material to be more easily separated once the heating process is complete, and the at least partially thermally cracked polymer material is allowed to cool. This is particularly easily achieved when the polymer material comprises a polymethacrylate, even more particularly when the polymer material comprises Elium® from Arkema.

As a result, a structural shell can be manufactured wherein at the end of life, the resin and basalt fibre starting materials can each be recovered in a state that is capable of being used again in, for example, another structural shell or the like. In other words, it is surprising that the structural shell of the present invention may be sufficiently strong for commercial use, while also being recyclable. One would not expect that it would be possible to manufacture a composite material in which the fibres do not substantially absorb the resin so that they can be recycled, and wherein the composite material has sufficient, and preferably desirable, flexural strength for use in a structural shell for a boat hull for a marine vessel and the like. It will be appreciated, however, that the structural shell described herein may also have any suitable use outside of the marine sector. For example, the structural shell described herein may be used in any of the following, non-limiting list of applications: wind, manual, electric and combustion propelled vessels (e.g. dinghy, kayak, powerboat, sailing yacht, powerboat etc.); skis; ski poles; construction poles (e.g. scaffolding); spinnaker poles and/or bowsprits (e.g. for sailing vessels); trains, tramway and metro components (e.g. nose, side panels etc.); wind turbine blades; furniture (e.g. chairs, tables, closets); automotive structures and body parts; radar/antenna covers; house building materials (e.g. walls, roofs, floors etc.); flagpoles; window frames; doors; suitcases; or flight simulators.

Preferably, the basalt fibres are fully encapsulated by the polymer material. However, typically, it is possible to see fibre print through on the surface of the basalt-fibre reinforced material. Such a structural shell may have high flexural strength per unit area and be suitable for use in the hull and/or deck of a marine vessel, a blade of a wind turbine, a ski, a ski pole, a fuselage of an aircraft, a body of a land vehicle and the like.

Preferably, the basalt fibre-reinforced material comprises substantially no voids. In particular, preferably, the basalt fibre-reinforced material comprises less than 1 vol. % voids, more preferably less than 0.5 vol. % voids, most preferably substantially no voids. Such a material may exhibit high flexural strength and be less likely to delaminate on flexing or bending.

The ratio by weight of basalt fibres to polymer material in the structural shell is preferably from 80:20 to 40:60, more preferably from 75:25 to 50:50, even more preferably from 70:30 to 55:45. Such ratios provides the optimal balance between cost, weight and strength per unit area of the structural shell due to the reduction in the amount of resin needed.

Preferably, the basalt fibres are dispersed in the polymer material in a regular arrangement, preferably wherein the fibre-reinforced material comprises a plurality of layers of substantially parallel basalt fibres, wherein the average direction of the substantially parallel basalt fibres is different in adjacent layers. More preferably, the average direction of the substantially parallel basalt fibres in each layer is about 45° or about 90° relative to the average direction of the substantially parallel basalt fibres in adjacent layers. Most preferably, the layers of substantially parallel basalt fibres are arranged quadri-axially, preferably with relative directions of the basalt fibers of −45°, 90°, 0-90° and 0°, tri-axially, preferably with relative directions of the basalt fibres of −45°, 90° and 45°, bi-axially, preferably with relative directions of the basalt fibres of 0° and 90°, or uni-directionally. Such an arrangement of the basalt fibres within the polymer material may provide a quasi-isotropic composite material which exhibits substantially equal mechanical properties in all planar directions. Such an arrangement of the basalt fibres within the polymer material may also provide a structural shell with desirably high flexural strength per unit area and resistance to wear. In particular, during the manufacture of the basalt fibre-reinforced material of the present invention, the Inventor has made a selection of several weaves of basalt fibres, based on weight ratio and fibre direction. Three types of fibre directions were made: (i) UNI (uni-directional or one direction strings of fibre), (ii) BI (bi-axial or two directions strings of fibre at 90°) and (iii) TRI (tri-axial or three directions of fibres (45-90°). In some embodiments, these weaves of basalt fibres may be layered on top of one another to form a layered structure which may exhibit quasi-isotropic properties, i.e. substantially equal mechanical properties in all planar directions. The loading of each weave relative to each other can also be varied, depending on the required properties and/or the purpose of the resulting composite material. However, it will be appreciated that the invention is not limited to a particular type of basalt-fibre weave and any conventional weave used in the art may be used in the basalt-fibre reinforced material described herein. Typical basalt fibre loadings in the weaves may be from 100 to 1200 $g/m^2$, preferably from 200 to 700 $g/m^2$ for use in boat hulls and the like.

In some embodiments, the structural shell further comprises a core, preferably a polymer core. The polymer core typically comprises a polyester, the polyester preferably comprises poly(ethylene terephthalate) (PET) and the PET preferably comprises a PET foam. The term "PET foam" as used herein may encompass a material comprising PET, wherein the PET comprises a plurality of gas-filled voids. However, in the structural shell described herein, the voids may be substantially filled with the polymer material, preferably entirely filled with the polymer material. The polymer core may form a layer within the structural shell. Typically, such a layer may be in the centre of the structural shell. For example, the polymer core may form a layer which is sandwiched between two or more layers of the basalt fibre-reinforced material, or may form a layer which is fully surrounded by the basalt fibre-reinforced material. Advantageously, when the structural shell further comprises a polymer core, the thickness of the structural shell may be increased without increasing the weight per unit area of the structural shell as much as when the structural shell does not comprise a polymer core. It will be appreciated that the tensile strength per unit area may be decreased by including the polymer core. However, such a structural shell may be particularly desirable when used for a deck for a marine vessel, for example, where such a loss is tensile strength may be compensated for by an increase in flexural strength. In some embodiments, other materials may be used for the polymer core instead of a PET core, for example PVC or a balsa. However, a PVC core is less desirable in the present invention, as it cannot be recycled. The polymer core may be of any thickness, depending on the particular application on the structural shell. However, typically, the polymer core may have a thickness of from 1 mm to 300 mm, preferably from 1 mm to 100 mm, more preferably from 5 to 50 mm, even more preferably from 10 to 30 mm.

As an alternative to a PET core, the polymer core may comprise the same polymer material as the basalt-fiber reinforced material. In other words, the core may be formed of the polymer material without basalt fibers. Such a core may be recovered at the same time as the polymer material of the basalt fiber reinforced material.

As an alternative to a polymer core, the structural shell may comprise a core comprising, for example, aluminium (melting point: approximately 650° C.), Rockwool or balsawood.

Preferably, the polymer material is capable of at least partially melting at a temperature of from 150 to 300° C., preferably from 200 to 250° C. and/or is capable of at least partially melting at a lower temperature than it is capable of at least partially thermally cracking. This is particularly desirable when the structural shell comprises a polymer core. Moreover, the polymer material is preferably capable of at least partially thermally cracking at a temperature of from 300 to 500° C., more preferably from 350 to 400° C. In addition to the above-described advantages, this is also particularly desirable when the structural shell comprises a polymer core. With the above-outlined properties, for example, when disassembling the structural shell, it may be possible to more easily recover the polymer core. This is particularly easier when the melting temperature of the polymer core is from 200 to 300° C., for example. This is because, on heating, the polymer material may melt at a lower temperature than the polymer core, and so the polymer core may be separated and recovered from the heated structural shell more easily. In particular, the solid polymer core may be more easily removed from the liquid polymer material. This may also reduce the likelihood of cross-contamination of the polymer core and the at least partially thermally cracked polymer material when heated to a higher temperature, so that the at least partially thermally cracked polymer material can be recycled. This may be because the polymer core can be removed from the heated structural shell before the structural shell is heated such that the polymer material at least partially thermally cracks (thereby avoiding the melting of the polymer core and mixing of the melted polymer core into the melted and/or at least partially thermally cracked polymer material). In this case, the polymer core, the at least partially thermally cracked polymer material and basalt fibres can each be recovered separately.

The polymer material is described as being capable of at least partially melting and/or at least partially thermally cracking at the recited temperatures. Typically, the polymer material is capable of substantially melting or thermally cracking at the recited temperatures, more typically completely melting or thermally cracking at the recited temperatures.

In some embodiments, the structural shell may further comprise a gelcoat, typically on an outer surface. Typically, the gelcoat comprises unsaturated polyester resins and/or vinyl esters. Preferably, the gelcoat comprises a pigment. The use of a gelcoat may advantageously provide a high-quality finish on the visible surface of the basalt fibre-reinforced material. Typically, the gelcoat provides a coloured, glossy surface which improves the aesthetic appearance of the structural shell, such as the surface of a boat hull, for example. The use of a gelcoat may also substantially reduce the number of labour hours to produce a final structural shell for use in, for example, a hull for a marine vessel. This is because the use of a gelcoat may eliminate the need to paint and/or polish the basalt fibre-reinforced material. The gelcoat typically has a thickness of from 1 to 3 mm.

Preferably, the structural shell exhibits a flexural strength of from 600 to 800 MPa before ageing. This is typically measured using a three point bending set-up. Ageing of the structural shell may include sea-water ageing, for example.

In a preferred embodiment, there is provided a structural shell comprising a basalt fibre-reinforced material, wherein the basalt fibre-reinforced material consists of basalt fibres, a polymer material, and optionally a hardening agent, the polymer material being capable of at least partially thermally cracking at a temperature of from 200 to 600° C., and wherein the polymer material comprises a polymethacrylate.

In a further aspect, the present invention provides a structural shell comprising a basalt fibre-reinforced polymer material, the polymer material being capable of at least partially thermally cracking at a temperature of from 200 to 600° C.

The advantages and preferable features of the first aspect apply equally to this aspect.

In a further aspect, the present invention provides a structural shell comprising a basalt fibre-reinforced thermoplastic material.

The advantages and preferable features of the first aspect apply equally to this aspect.

In a further aspect, the present invention provides a basalt-fibre reinforced material, wherein the basal fibre-reinforced material comprises a polymer material, the polymer material being capable of at least partially thermally cracking at a temperature of from 200 to 600° C. The basalt fibre-reinforced material may be for a structural shell.

The advantages and preferable features of the first aspect apply equally to this aspect.

In a further aspect, the present invention provides a hull for a marine vessel comprising the structural shell described herein.

The advantages and preferable features of the first aspect apply equally to this aspect.

In a further aspect, the present invention provides a structural grid for a marine vessel comprising the structural shell described herein.

The advantages and preferable features of the first aspect apply equally to this aspect.

In a further aspect, the present invention provides a deck for a marine vessel comprising the structural shell described herein.

The advantages and preferable features of the first aspect apply equally to this aspect.

In a further aspect, the present invention provides a marine vessel comprising at least one hull and/or at least one structural grid and/or at least one deck, wherein the at least one hull and/or at least one structural grid and/or at least one deck are as described above.

The advantages and preferable features of the first aspect apply equally to this aspect.

The at least one deck may be mounted to and/or be at least partially formed by the hull. The marine vessel may comprise a power boat (for example powered by a mechanically or electrically powered engine), a sailing vessel (for example a yacht or a dinghy), a rowing boat or the like.

The at least one hull may at least partially comprise the structural shell. The hull may be for receiving the water pressure load when the marine vessel is floating and may form a bottom and at least part of sides of the marine vessel. The composite material may extend across at least 90% or all of the area of the hull.

The at least one hull may comprise the structural shell in the monolithic structure. As a result, by selecting the appropriate thickness, the at least one hull may have a relatively high strength and impact resistance per unit area. Such an arrangement is particularly suitable if the marine vessel comprises a power boat and therefore the hull repeatedly receives high force impacts from waves when travelling at high speeds.

Alternatively, the at least one hull may comprise the structural shell in the sandwich structure (e.g. with the PET layer), which may have a lower weight per unit area and lower strength per unit area than the monolithic structure. Such an arrangement may be suitable if the marine vessel comprises a sailing vessel or rowing boat and therefore travels at relatively low speeds with relatively low forces impacting the hull.

The at least one deck may comprise the structural shell in the sandwich structure. As a result, the at least one deck may have a lower strength per unit area than the at least one hull. However, the at least one deck may have a lower weight per unit area than the at least one hull to reduce the overall weight of the marine vessel.

The at least one structural grid may be for providing general support and structure within the marine vessel, for example within the internal structure of the marine vessel, such as within the hull.

In a particular embodiment the marine vessel may be a rigid inflatable boat comprising a rigid hull and a tube around at least part of an upper edge of the rigid hull. The rigid hull may comprise the structural shell, preferably in the monolithic structure. The tube may have any cross-section, for example circular, semi-circular, square, triangular or other. The tube may be hollow or may be filled, for example with foam and/or rubber and/or plastic or the like. For example, the tube may be a D-collar.

In a further aspect, the present invention provides a wind turbine blade comprising the structural shell described herein.

The advantages and preferable features of the first aspect apply equally to this aspect.

In a further aspect, the present invention provides a ski or ski pole comprising the structural shell described herein.

The advantages and preferable features of the first aspect apply equally to this aspect.

In a further aspect, the present invention provides a ballistic resistant panel comprising the structural shell described herein. Advantageously, the ballistic resistant panel may pass ballistic resistance test NIJ-STD-0108.01 level III and NIJ-STD-0108.01 level IIIA.

The advantages and preferable features of the first aspect apply equally to this aspect.

Preferably, the ballistic resistant panel has a ratio by weight of polymer material to basalt fibres of from 0.35 to 0.45, preferably from 0.39 to 0.44. A ratio by weight of polymer material to basalt fibres of about 0.41 to about 0.43 has been found to be particularly effective. Such a ratio may improve the ballistic resistance of the panel.

The ballistic resistant panel may be used, for example, in body armour (e.g. a helmet or a bullet proof vest), a vehicle, an aircraft or a structure (e.g. a building).

In a further aspect, the present invention provides body armour, a helmet, a bullet proof vest, a vehicle, an aircraft, a structure or a building comprising the ballistic resistant panel described herein.

The advantages and preferable features of the first aspect apply equally to this aspect.

In a further aspect, the present invention provides a method of manufacturing the structural shell, hull, deck, structural grid, marine vessel, wind turbine blade, ski or ski pole, or ballistic resistant panel described herein, the method comprising:

providing a mould;

introducing basalt fibres into the mould;

contacting the basalt fibres with a mixture comprising a resin and a hardening agent at a relative pressure of −0.65 bar or less to form a structural shell, hull, deck, structural grid, marine vessel, wind turbine blade, ski or ski pole, or ballistic resistant panel; and recovering the structural shell, hull, deck, structural grid, marine vessel, wind turbine blade, ski or ski pole, or ballistic resistant panel from the mould.

The advantages and preferable features of the first aspect apply equally to this aspect.

Typically, the general term for such a method of manufacturing a structural shell or the like may be understood as "vacuum infusion". Vacuum infusion methods are known in the art.

The term "mould" as used herein may encompass a hollow container or shell used to give shape to the resin on curing into the basalt fibre-reinforced material. The mould may be suitable for shaping the resin into a shape such as, for example, a hull and/or deck of a marine vessel, a blade of a wind turbine, a fuselage of an aircraft, a body of a land vehicle and the like.

The basalt fibres may be introduced into the mould in a regular arrangement, preferably wherein the basalt fibres are introduced into the mould so that the resulting fibre-reinforced material comprises a plurality of layers of substantially parallel basalt fibres, wherein the average direction of the substantially parallel basalt fibres is different in adjacent layers. More preferably, the basalt fibres are introduced into the mould so that the average direction of the substantially parallel basalt fibres in each layer is about 45° or about 90° relative to the average direction of the substantially parallel basalt fibres in adjacent layers. Most preferably, the basalt fibres are introduced into the mould so that the the layers of substantially parallel basalt fibres are arranged quadri-axially, preferably with relative directions of the basalt fibers of −45°, 90°, 0-90° and 0°, tri-axially, preferably with relative directions of the basalt fibres of −45°, 90° and 45°, bi-axially, preferably with relative directions of the basalt fibres of 0° and 90°, or uni-directionally. Such an arrangement of the basalt fibres within the polymer material may provide a quasi-isotropic composite material which exhibits substantially equal mechanical properties in all planar directions. Such an arrangement of the basalt fibres within the polymer material may also provide a structural shell with desirably high flexural strength per unit area and resistance to wear.

Without wishing to be bound by theory, it is thought that the negative relative pressure applied during the contacting step may enable the resin to fully encapsulate the basalt fibres, while also eliminating substantially all of the gas voids from the basalt fibre-reinforced material. Thus, a structural shell may be provided wherein the basalt fibre-reinforced material may be substantially free of gas voids. Such a structural shell may exhibit desirably high flexural strength per unit area and/or impact resistance and/or reduced likelihood of delamination on flexing or bending.

The method may advantageously comprise one or more of:

the application of ultrasonic sound waves during the contacting step so as to improve resin flow during infusion;

hand lay-up of composite elements;

pultrusion;

prepreg process;

resin transfer moulding; and vacuum-assisted resin transfer moulding.

The term "resin" as used herein may encompass a fluid comprising monomers and/or polymers that, when mixed with the hardening agent, is capable of polymerisation and/or crosslinking to provide a solid polymer material. The term "hardening agent" as used herein may encompass a substance that causes the resin to harden, for example by polymerisation and/or crosslinking, or otherwise.

Preferably, the resin comprises methacrylate monomers, more preferably methyl methacrylate monomers, and even more preferably from 50 to 85 wt. % methyl methacrylate monomers and/or from 10 to 50 wt. % acrylic polymers.

Preferably, the hardening agent comprises an organic peroxide, preferably benzoyl peroxide. A commercially available organic peroxide that is particularly suitable for use in the present invention is Perkadox® GB-50X from Nouryon. Other organic peroxides and/or Perkadox® hardeners may be used. For example, di(2,4-dichlorobenzoyl) peroxide, di(4-methylbenzoyl) peroxide, di(tert-butylperoxyisopropyl)benzene and/or dicumyl peroxide, or mixtures thereof, including or not including benzoyl peroxide. Other commercially available organic peroxides that are particularly suitable for use in the present invention are Elium® 191XO/SA (for longer polymerisation time of circa three hours) and Elium® 158XO/SA (for shorter polymerisation time of circa one hour) from Arkema. These are three component all liquid systems, including two resins and a hardener (mekp type Butanox M50).

Preferably, the mixture comprises the hardening agent in an amount of from 0.5 to 30 phr, more preferably from 1 to 15 phr, even more preferably from 1.5 to 4 phr, still more preferably from 2.5 to 4 phr (wherein "phr" mean parts per hundred by weight in the present context). This is typically the amount required to provide satisfactory hardening of the resin to obtain the basalt fibre-reinforced material described herein.

Typically, the basalt fibres are contacted with the mixture at a relative pressure of from −0.65 to −1.15 bar. Preferably, the basalt fibres are contacted with the mixture at a relative pressure of from −0.7 to −1.15 bar, more preferably from −0.85 to −1.15 bar, even more preferably from −0.9 to −1.1 bar, still even more preferably from −0.95 to −1.05 bar. A relative pressure of greater than −0.65 bar, or for some materials −0.85 bar, typically does not eliminate substantially all of the gas voids from the basalt fibre-reinforced material and/or enable a strong bond to be formed between the polymer material and the basalt fibres. In general, the lower the relative pressure, the denser the resulting basalt fibre-reinforced material and the stronger the bond formed between the basalt fibres and the polymer material. This lower pressure is particularly critical when the structural shell comprises a polymer core. Without wishing to be bound by theory, this is so that the resin may be sucked substantially through all of the voids in the foam of the polymer core, preferably through all of the voids in the foam. However, a relative pressure of less than −1.15 bar may deform the mould and/or the basalt fibre-reinforced material. Moreover, such a low relative pressure may damage the vacuum bag. For some structural shell designs, a relative pressure of less than −1.05 bar may deform the mould and/or the basalt fibre-reinforced material.

Typically, the basalt fibres are contacted with the mixture at a temperature of from 10 to 40° C., preferably from 14 to 30° C. Such a temperature range enables significant cost savings during the manufacturing process at least because less complex equipment may be required.

Typically, the basalt fibres are contacted with the mixture at a humidity of from 30 to 70%, preferably from 40 to 50%.

Preferably, the basalt fibres are contacted with the mixture under the applied pressure for from 5 minutes to 12 hours, preferably for from 1 hour to 6 hours, more preferably for from 90 minutes to 3 hours. The basalt fibres are contacted with the mixture under the applied pressure for a time suitable for providing a solid structural shell. This may be to enable the structural shell to fully solidify before being removed from the mould. Higher contacting temperatures may require shorter contacting times.

Once the structural shell has been recovered from the mould, it may be subjected to a temperature of from 50 to 150° C., typically for a time of from 1 to 10 hours. This may constitute a "post curing" step.

Contacting the basalt fibres with a mixture comprising a resin and a hardening agent typically comprises introducing the resin and hardening agents into a bag containing the mould. Typically, the resin and hardening agent are exposed to atmospheric pressure to cause the resin and hardening agent to enter the (reduced pressure) bag. Alternatively, the resin and hardening agent are exposed to a positive pressure of from +0.1 to +15 bar, preferably from +0.2 t+0.6 bar, to cause the resin and hardening agent to enter the bag.

In a further embodiment, the method further comprises forming a gelcoat in the mould prior to the introduction of the basalt fibres into the mould.

In a further embodiment, the method further comprises introducing a polymer core into the mould prior to contacting the basalt fibres with the mixture. Typically, the polymer core is introduced into the mould between two or more basalt fibres, preferably wherein the polymer core is introduced into the mould to form a layer separating two or more layers of basalt fibres. The polymer core may be introduced into the mould and surrounded by the basalt fibres. Alternatively, the polymer core may be sandwiched between layers of basalt fibres.

In some embodiments, the mixture further comprises a rheology modifier and/or release agent. Rheology modifiers may improve the flow of the resin into the mould and release agents may help make removing the structural shell and the like from the mould easier. Examples of such additives include Cirex® 388 and Chemtrend® R&B.

Moreover, the method of manufacturing the structural shell and the like described herein may also be safer than those of the prior art. This may be because the reaction of the resin and hardening agent used herein is less exothermic than those of the prior art for making hulls for marine vessels and the like, particularly when the resin and hardening agent used are as described above. Thus, the method may pose less of a fire risk during the vacuum infusion process, because the structural shell or the like being manufactured may heat up to a lower temperature.

In a further aspect, the present invention provides a method of disassembling the structural shell, hull, deck, structural grid marine vessel, wind turbine blade, ski or ski pole, or ballistic resistant panel (or other object) described herein, the method comprising:

provided the structural shell, hull, deck, structural grid, marine vessel, wind turbine blade, ski or ski pole, ballistic resistant panel (or other object described herein);

heating the structural shell, hull, deck, structural grid, marine vessel, wind turbine blade, ski or ski pole, or ballistic resistant panel (or other object described herein) to a temperature of from 200 to 600° C. to at least partially thermally crack the polymer material;

separating the at least partially thermally cracked polymer material from the basalt fibres; and recovering the basalt fibres and/or the at least partially thermally cracked polymer material.

The advantages and preferable features of the first aspect apply equally to this aspect.

Preferably, the heating is carried out in an inert atmosphere, preferably in the substantial absence of oxygen. Without wishing to be bound by theory, it is thought that such conditions may reduce the likelihood that the polymer material and/or polymer core may combust and/or be damaged in any way during the method of disassembling the structural shell. Preferably, the heating is carried out at a temperature of from 250 to 500° C., more preferably from 300 to 500° C., even more preferably from 350 to 400° C.

Preferably, the heating is carried out at a pressure of at least 10 bar. Such a high pressure may facilitate pyrolysis such that the material may be recycled into fuels, monomers, or other valuable materials by thermal and catalytic cracking processes.

The recovered basalt fibres are preferably suitable for being reused and/or recycled. For example, the recovered basalt fibres are suitable for being reused in a structural shell according to the present invention, or for other applications. Without wishing to be bound by theory, this is because the basalt fibres may not absorb substantial amounts, if any, of the resin during manufacture, and the basalt fibres can thus be recovered in substantially the same condition as before they were used in the structural shell. For example, the recovered basalt fibres may exhibit substantially no deterioration in their physical and/or mechanical properties. Further reasons for this are discussed above.

The recovered at least partially thermally cracked polymer material may also be suitable for being reused and/or re- or down-cycled. For example, the recovered at least partially thermally cracked polymer material may also be suitable for being reused in a structural shell according to the present invention, or for other applications. Without wishing to be bound by theory, this is because the recovered at least partially thermally cracked polymer material may be recovered in a form suitable for being re-mixed with a hardening agent and remoulded to form a new product. For example, the recovered at least partially thermally cracked polymer material may exhibit substantially no deterioration in its physical and/or mechanical properties compared to the resin used to manufacture the structural shell or the like.

In some embodiments, the structural shell comprises a polymer core, and the method further comprises recovering the polymer core. Preferably, the polymer core is recovered prior to heating to a temperature of from 200 to 600° C., the method comprising: heating the structural shell, hull, deck, marine vessel, wind turbine blade or ski and and/or ski pole (or other object described herein) to a temperature of from 150 to 300° C. to at least partially melt the polymer material;

separating the polymer core from the at least partially melted polymer material; and recovering the polymer core.

The recovered polymer core may also be suitable for being reused and/or re- or down-cycled. For example, the recovered polymer core may also be suitable for being reused in a structural shell according to the present invention, or for other applications. Without wishing to be bound by theory, this is because the recovered polymer core may exhibit substantially no deterioration in its physical and/or mechanical properties. This is because, at this lower temperature, preferably, the polymer core remains solid. The advantages of this are discussed above.

In some embodiments, the structural shell comprises a gelcoat, and the method further comprises at least partially mechanically removing the gelcoat prior to heating and/or removing the gelcoat by combustion of the gelcoat. For example, the gelcoat may be at least partially mechanically removed by sanding. The at least partial removal of the gelcoat may reduce the likelihood of contamination of the recovered products by any gelcoat that may remain.

In a further aspect, the present invention provides a method of disassembling the structural shell, hull, deck, structural grid marine vessel, wind turbine blade, ski or ski pole, or ballistic resistant panel (or other object) described herein, the method comprising:

providing the structural shell, hull, deck, structural grid, marine vessel, wind turbine blade, ski or ski pole, or ballistic resistant panel (or other object described herein);

contacting the structural shell, hull, deck, structural grid, marine vessel, wind turbine blade, ski or ski pole (or other object described herein) with a solvent to at least partially dissolve the polymer material; and recovering the basalt fibers and/or the polymer material and/or the solvent.

The advantages and preferable features of the first aspect apply equally to this aspect.

The basalt fibres may be recoverable without substantial, typically any, deterioration in physical and/or mechanical properties of the basalt fibres. The solvent must be capable of at least partially dissolving the polymer material.

Suitable solvents are known in the art. A particularly suitable solvent is one that comprises acetone. Typically substantially all of the polymer material is dissolved in the solvent. The polymer material may be recovered by, for example evaporating the solvent. The solvent may be recovered by, for example, condensing the evaporated solvent.

The structural shell of the present invention may also be recycled using mechanical methods, such as compounding with another polymer and/or hot pressing to make sheets.

The invention will now be described in relation to the following non-limiting drawings in which.

Figure 1:
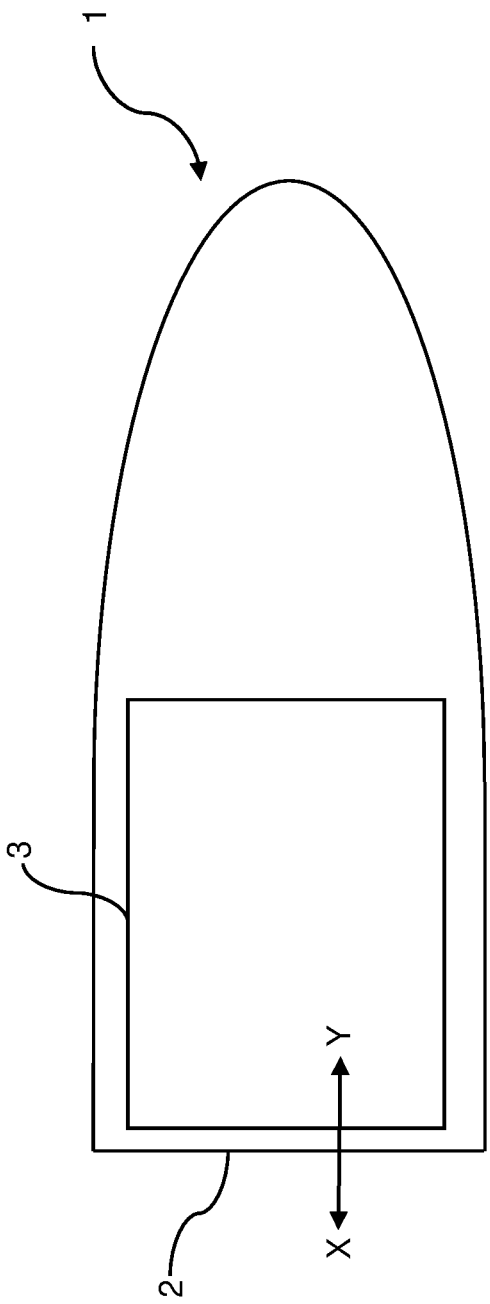
FIG. 1 is a schematic of a marine vessel comprising a structural shell according to the present invention.
Figure 2:
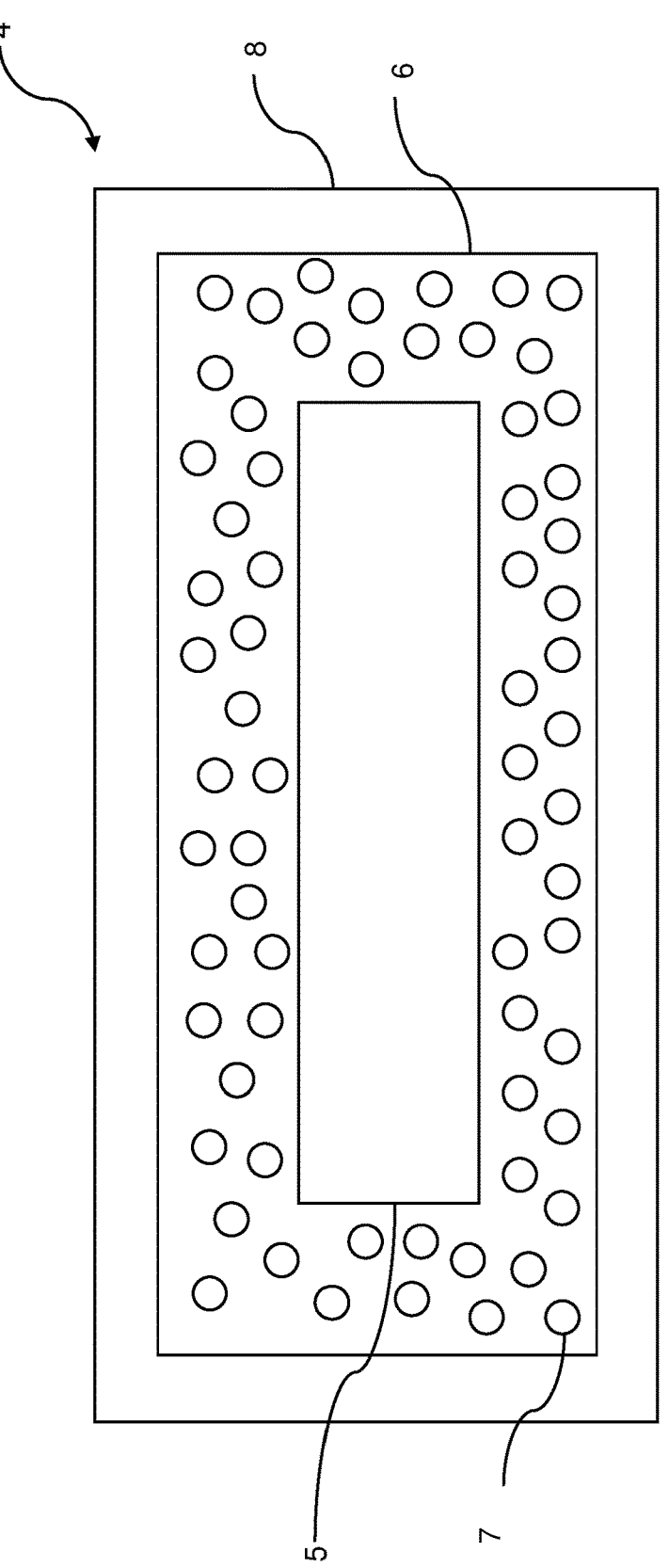
FIG. 2 is schematic of the cross section X-Y of FIG. 1.

Referring to FIG. 1, there is shown a schematic of a marine vessel according to the present invention (shown generally at 1) having a hull 2 and a deck 3. FIG. 2 shows a cross-section along the line X-Y of FIG. 1. There is shown a structural shell (shown generally at 4) containing a polymer core 5 surrounded by polymer material 6 reinforced with basalt fibres 7. The basalt fibre-reinforced material 6 is coated with a gelcoat 8.

Figure 3:
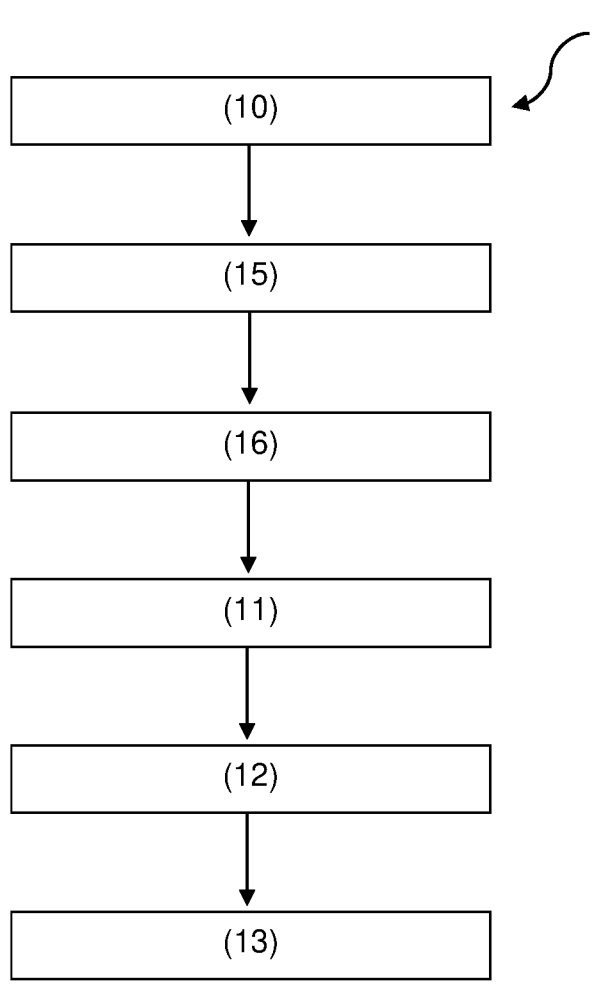
FIG. 3 is a flow chart of a method of manufacturing the structural shell according to the present invention.

Referring to FIG. 3, there is shown a flow chart of a method of manufacturing the structural shell, hull, structural grid, deck, marine vessel, wind turbine blade or ski and and/or ski pole according to the present invention (shown generally at 9). The method comprises: 10 providing a mould; 11 introducing basalt fibres into the mould; 12 contacting the basalt fibres with a mixture comprising a resin and a hardening agent at a relative pressure of −0.65 bar or less to form a structural shell, hull, deck, marine vessel, wind turbine blade or ski and and/or ski pole; and 13 recovering the structural shell, hull, structural grid, deck, marine vessel, wind turbine blade or ski and and/or ski pole from the mould. Optionally, the method further comprises 15 forming a gelcoat in the mould prior to the introduction of the basalt fibres into the mould. Optionally, the method further comprises 16 introducing a polymer core into the mould prior to contacting the basalt fibres with the mixture.

Figure 4:
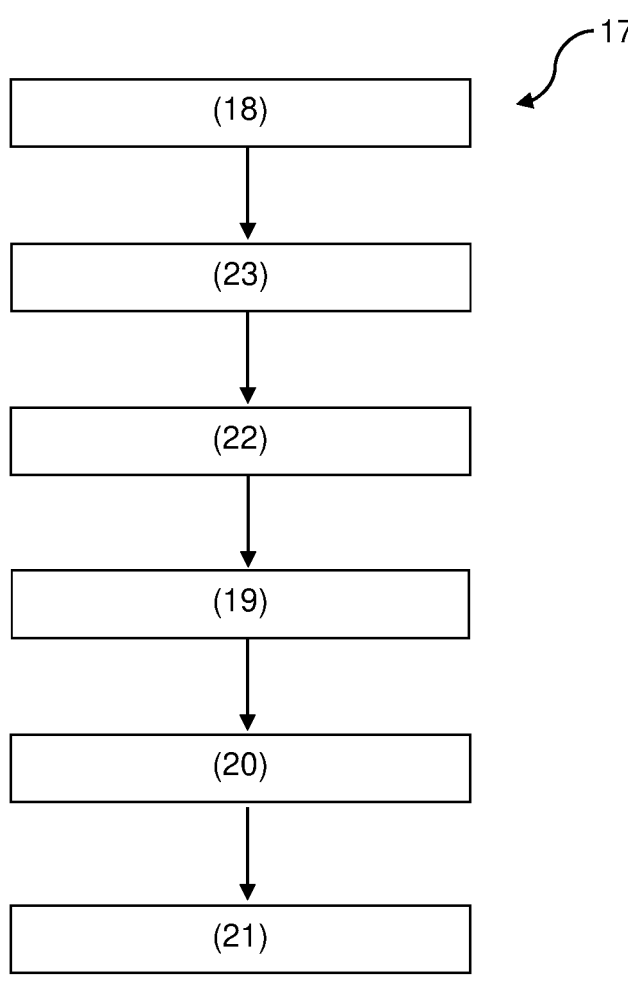
FIG. 4 is a flow chart of a method of disassembling a structural shell according to the present invention.

Referring to FIG. 4, there is shown a flow chart of a method of disassembling a structural shell, hull, structural grid, deck, marine vessel, wind turbine blade or ski and and/or ski pole according to the present invention (shown generally at 17). The method comprises: 18 providing the structural shell, structural grid, hull, deck, marine vessel, wind turbine blade or ski and and/or ski pole; 19 heating the structural shell, hull, structural grid, deck, marine vessel, wind turbine blade or ski and and/or ski pole to a temperature of from 200 to 600° C. to at least partially thermally crack the polymer material; 20 separating the at least partially thermally cracked polymer material from the basalt fibres; and 21 recovering the basalt fibres and/or the at least partially thermally cracked polymer material. Optionally, the structural shell comprises a polymer core, and the method further comprises 22 recovering the polymer core. Optionally, the structural shell comprises a gelcoat, and the method further comprises 23 at least partially mechanically removing the gelcoat prior to heating and/or removing the gelcoat by combustion of the gelcoat.

Figure 5:
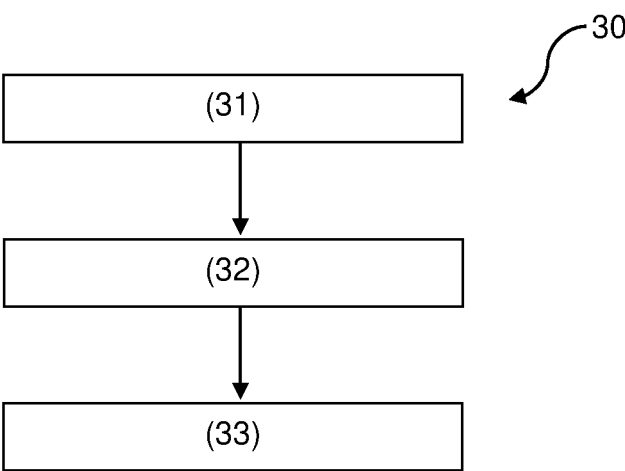
FIG. 5 is a flow chart of a method of disassembling a structural shell according to the present invention.

Referring to FIG. 5, there is shown a flow chart of a method of disassembling a structural shell, hull, structural grid, deck, marine vessel, wind turbine blade or ski and and/or ski pole according to the present invention (shown generally at 30). The method comprises 31 providing the structural shell, hull, deck, structural grid, marine vessel, wind turbine blade, ski or ski pole (or other object described herein); 32 contacting the structural shell, hull, deck, structural grid, marine vessel, wind turbine blade, ski or ski pole (or other object described herein) with a solvent to at least partially dissolve the polymer material; and 33 recovering the basalt fibers and/or the polymer material.

Figure 6:
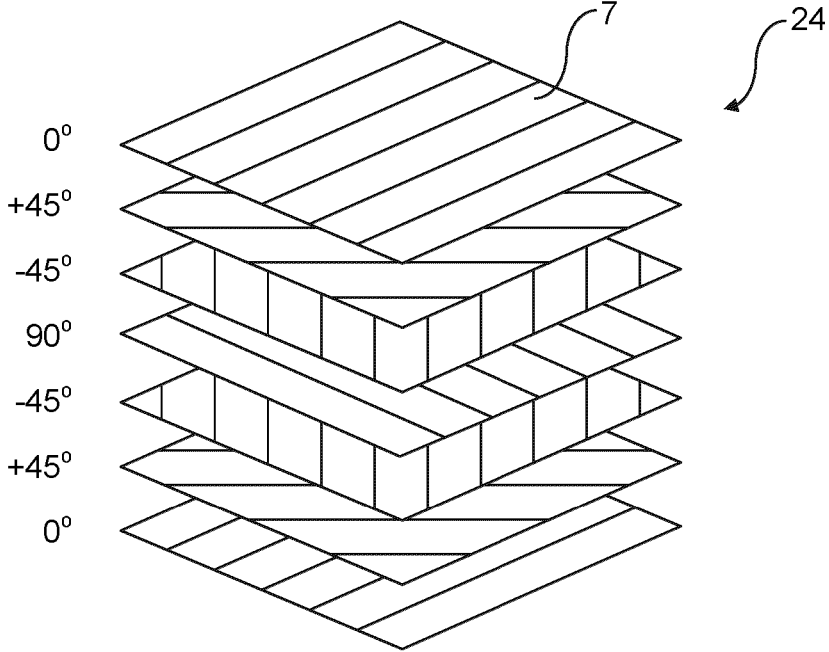
FIG. 6 is a schematic of an exploded view of the basalt fibre layer structure of a structural shell according to the present invention.

Referring to FIG. 6, there is shown a schematic of an exploded view the basalt fibre layer structure of a structural shell according to the present invention (shown generally at 24). There is shown a plurality of layers of substantially parallel basalt fibres 7, wherein the average direction of the substantially parallel basalt fibres 7 in each layer is about 45° or about 90° relative to the average direction of the substantially parallel basalt fibres 7 in adjacent layers.

The invention will now be described in relation to the following non-limiting examples.

EXAMPLE 1

A basalt-fibre reinforced material as described herein was manufactured according to the methods described herein. The material had a monolithic structure. That is, the material consisted of a single piece of basalt fibre-reinforced material. The manufactured material was a 1 m×1 m panel.

Step 1:

The weaves (layers) of basalt fibres were laid up in the following three layers:

Layer 1: 600 TRI (600 g/m² tri-axial weave)

Layer 2: 550 UNI (550 g/m² uni-directional weave)

Layer 3: 600 TRI (600 g/m² tri-axial weave)

Step 2:

A wooden table was wrapped as an envelope to secure a full vacuum seal around. The layer structure of step 1 was introduced into the envelope. The plastic wrap was sealed with tack tape in order seal off the bag completely. The layer structure of step 1 was in this "envelope", ready to be infused. Peel ply was added on top of the layers (in order to release the vacuum bag from the composite easily and to create a better end finish) and on top of that a mesh was added to help the resin flow more gradually. At one end of the vacuum table (at the end of each part of the envelope) there was a spiral tube, which helps the resin flow over the width of the panel more gradually.

A vacuum pump was installed to a vacuum container (for capturing resin overflow). The bag was tested to be airtight by building up a relative pressure of −1.0 bar. Once a relative pressure of −1.0 bar was reached, the valves were closed and the vacuum pump was stopped for a so-called drop test (to measure eventual air leakage).

After completing the above steps, 3000 g of Elium® from Arkema was mixed with 85 g of benzoyl peroxide hardening agent (Perkadox® GB-50X from Nouryon) in a bucket. Once mixed, the bucket with the Eliume/Perkadox® GB-50X resin was connected to the vacuum bag and the vacuum pump was started again. This created a flow of resin due to the negative relative pressure over the entire panel.

This step was carried out at room temperature.

Step 3:

The resin was kept under the reduced pressure for approximately 90 minutes. The composite was then left overnight in the vacuum bag and the vacuum bag was removed the morning after to recover the basalt fibre-reinforced material.

The monolithic basalt fibre-reinforced material was capable of being recycled by the methods described herein.

EXAMPLE 2

A monolithic basalt-fibre reinforced material was manufactured as described in Example 1. However, the layer structure of step 1 was different. In this example, the weaves (layers) of basalt fibres were laid up in the following four layers:

Layer 1: 550UNI (550 g/m² uni-directional weave)

Layer 2: 300 BI (300 g/m² bi-axial weave)

Layer 3: 300 BI (300 g/m² bi-axial weave)

Layer 4: 550UNI (550 g/m² uni-directional weave; oriented at 90° from layer 1)

The monolithic basalt fibre-reinforced material was capable of being recycled by the methods described herein.

EXAMPLE 3

A sandwich-structure basalt-fibre reinforced material was manufactured as described in Example 1. However, the layer structure of step 1 was different. In this example, the weaves (layers) of basalt fibres were laid up in the following four layers, with a PET foam core in the centre:

Layer 1: 550UNI (550 g/m² uni-directional weave)

Layer 2: 300 BI (300 g/m² bi-axial weave)

Layer 3: PET foam core (thickness: 20 mm)

Layer 4: 300 BI (300 g/m² bi-axial weave)

Layer 5: 550UNI (550 g/m² uni-directional weave)

The sandwich-structure material was a 1 m×0.10 m panel. The sandwich-structure basalt fibre-reinforced material was capable of being recycled by the methods described herein.

When the PET core is present, it is crucial that the resins flows through the injection holes in the PET core to create a strong bond at both ends of the sandwich.

EXAMPLE 4

Panels comprising the basalt-fibre reinforced material described herein were prepared according to the following method steps:

1. Prior to work: Prepare lamination room at room temperature between 18 and 24° C. Max humidity 45%;
2. Degrease and clean lamination table;
3. Wax lamination table with mould release wax;
4. Apply first layer of peel ply, ends glued with aerosol adhesive;
5. Marking layers setup with masking tape;
6. Lay-up fibre weaves according to Table 1;
7. Cover lay-up with peel ply and glue ends with aerosol adhesive;
8. Set-up tacky tape on flat surface on lamination table;
9. Add mesh flow media and keep flat on surface with masking tape;
10. Install 3×10 mm spiral, positioned with masking tape. 1 suction point on cloth, 1 vacuum point in the middle of the lay-up and the last one at the end on mesh flow media;
11. Install vacuum points in centre of spirals;
12. Set-up vacuum pack on the tacky tape. Envelop the lamination table when table has porosity;
13. Install 10 mm infusion hoses on vacuum points and seal the connections with tacky tape;
14. Drop test vacuum test prior to infusion. Pressure −0.80/−1.00 bar. Drop allowance 0.5 bar/20 min;
15. Mix 2.7% of Perkadox GB50 with the Elium (10 kg Elium=270 g Perkadox GB50);
16. De-gas Elium/Perkadox mixture for 7-10 min;
17. Put de-gassed, mixed bucket of resin, levelled under the lamination table;
18. Put infusion hoses in bucket resin (eventually taped on a solid bar to keep hoses in position);
19. Open valve #2 slowly to have all resins in the tubes and no air. Close the valve before the resin enters the fibres;
20. Start infusion opening valve #1;
21. When resin flows 3 cm behind vacuum point #2, open valve point #2 by 25%-50% and open full when resins are visually over the panel;
22. Close vacuum point #1 when catalyst starts working and panel increases temperature of 35° C.
23. Keep vacuum on till resin fully cures;
24. Wait till panel temperature drops to room temperature;
25. De-mould.

TABLE 1

| | | layer structure | |
|---|---|---|---|
| Layer | Weave | Lay up (°) | Surface (m²) |
| 1 | UNI 550 | | 1 |
| 2 | UNI 550 | 90 | 1 |
| 3 | UNI 550 | | 1 |
| 4 | UNI 550 | 90 | 1 |
| 5 | UNI 550 | | 1 |
| 6 | UNI 550 | 90 | 1 |

TABLE 1-continued

| | layer structure | | |
|---|---|---|---|
| Layer | Weave | Lay up (°) | Surface (m²) |
| 7 | UNI 550 | | 1 |
| 8 | UNI 550 | 90 | 1 |
| 9 | UNI 550 | | 1 |
| 10 | UNI 550 | 90 | 1 |
| 11 | UNI 550 | | 1 |
| 12 | UNI 550 | 90 | 1 |
| 13 | UNI 550 | | 1 |
| 14 | UNI 550 | 90 | 1 |
| 15 | UNI 550 | | 1 |
| 16 | UNI 550 | 90 | 1 |
| 17 | UNI 550 | | 1 |
| 18 | UNI 550 | 90 | 1 |
| 19 | UNI 550 | | 1 |
| 20 | UNI 550 | 90 | 1 |
| 21 | UNI 550 | | 1 |
| 22 | UNI 550 | 90 | 1 |
| 23 | UNI 550 | | 1 |
| 24 | UNI 550 | 90 | 1 |
| 25 | UNI 550 | | 1 |
| 26 | UNI 550 | 90 | 1 |
| 27 | UNI 550 | | 1 |
| 28 | UNI 550 | 90 | 1 |
| 29 | UNI 550 | | 1 |
| 30 | UNI 550 | 90 | 1 |
| 31 | UNI 550 | | 1 |
| 32 | UNI 550 | 90 | 1 |

The total weave and panel area was therefore 32 m².

Three different pressures were used to manufacture three panels, respectively, each having the 32-layer structure of Table 1: −0.80, −0.85 and −0.90 bar. The total weight of each component for each panel are shown in Table 2.

TABLE 2

| weights of components in panel | | | |
|---|---|---|---|
| Pressure (bar): | −0.80 | −0.85 | −0.90 |
| Fibres (kg): | 17.60 | 17.60 | 17.60 |
| Resin (kg): | 7.57 | 7.39 | 7.22 |
| Perkadox (kg): | 0.204 | 0.200 | 0.195 |
| Total panel weight (kg): | 25.37 | 25.19 | 25.01 |

This shows that the more negative the pressure applied, the lower the resin:fibre ratio in the panel.

The same method was also used to prepare panels of roughly half the area. The layer structure is shown in Table 3.

TABLE 3

| | layer structure | | |
|---|---|---|---|
| Layer | Weave | Lay up (°) | Surface (m²) |
| 1 | UNI 550 | | 0.54 |
| 2 | UNI 550 | 90 | 0.54 |
| 3 | UNI 550 | | 0.54 |
| 4 | UNI 550 | 90 | 0.54 |
| 5 | UNI 550 | | 0.54 |
| 6 | UNI 550 | 90 | 0.54 |
| 7 | UNI 550 | | 0.54 |
| 8 | UNI 550 | 90 | 0.54 |
| 9 | UNI 550 | | 0.54 |
| 10 | UNI 550 | 90 | 0.54 |
| 11 | UNI 550 | | 0.54 |
| 12 | UNI 550 | 90 | 0.54 |
| 13 | UNI 550 | | 0.54 |
| 14 | UNI 550 | 90 | 0.54 |
| 15 | UNI 550 | | 0.54 |

TABLE 3-continued

| | layer structure | | |
|---|---|---|---|
| Layer | Weave | Lay up (°) | Surface (m²) |
| 16 | UNI 550 | 90 | 0.54 |
| 17 | UNI 550 | | 0.54 |
| 18 | UNI 550 | 90 | 0.54 |
| 19 | UNI 550 | | 0.54 |
| 20 | UNI 550 | 90 | 0.54 |
| 21 | UNI 550 | | 0.54 |
| 22 | UNI 550 | 90 | 0.54 |
| 23 | UNI 550 | | 0.54 |
| 24 | UNI 550 | 90 | 0.54 |
| 25 | UNI 550 | | 0.54 |
| 26 | UNI 550 | 90 | 0.54 |
| 27 | UNI 550 | | 0.54 |
| 28 | UNI 550 | 90 | 0.54 |
| 29 | UNI 550 | | 0.54 |
| 30 | UNI 550 | 90 | 0.54 |
| 31 | UNI 550 | | 0.54 |
| 32 | UNI 550 | 90 | 0.54 |

The total weave and panel area was therefore 17.28 m².

The same three different pressures were used to manufacture three panels having the 32-layer structure of Table 3, i.e. −0.80, −0.85 and −0.90 bar. The total weight of each component for each panel are shown in Table 4.

TABLE 4

| weights of components in panel | | | |
|---|---|---|---|
| Pressure (bar): | −0.80 | −0.85 | −0.90 |
| Fibres (kg): | 9.50 | 9.50 | 9.50 |
| Resin (kg): | 3.90 | 3.75 | 4.15 |
| Resin:fibre ratio: | 41.05% | 39.47% | 43.68% |
| Total panel weight (kg): | 13.40 | 13.25 | 13.65 |
| Panel thickness (mm): | 12.75 | 12.35 | 12.80 |

The panels were subjected to armour protection ballistic resistance testing (NIJ-STD-0108.01 levels III and IIIA) and passed.

EXAMPLE 5

Panels comprising the basalt-fibre reinforced material described herein were prepared according to the following method steps:

1. Prior to work: Prepare lamination room at room temperature between 18 and 24° C. Max humidity 45%;
2. Degrease and clean lamination table;
3. Wax lamination table with mould release wax;
4. Apply first layer of peel ply, ends glued with aerosol adhesive;
5. Marking layers setup with masking tape;
6. Lay-up fibre weaves according to Table 5;
7. Cover lay-up with peel ply and glue ends with aerosol adhesive;
8. Set-up tacky tape on flat surface on lamination table;
9. Add mesh flow media and keep flat on surface with masking tape;
10. Install 3×10 mm spiral, positioned with masking tape. 1 suction point on cloth, 1 vacuum point in the middle of the lay-up and the last one at the end on mesh flow media;
11. Install vacuum points in centre of spirals;
12. Install pressure gauge;
13. Set-up vacuum pack on the tacky tape. Envelop the lamination table when table has porosity;
14. Install 10 mm infusion hoses on vacuum points and seal the connections with tacky tape;

15. Drop test vacuum test prior to infusion. Pressure −1.00 bar. Drop allowance 0.5 bar/20 min;
16. Mix 2.7% of Perkadox GB50 with the Elium (10 kg Elium=270 g Perkadox GB50);
17. De-gas Elium/Perkadox mixture for 7-10 min;
18. Put de-gassed, mixed bucket of resin, levelled under the lamination table;
19. Put infusion hoses in bucket resin (eventually taped on a solid bar to keep hoses in position);
20. Start infusion opening valve #1;
21. When resin flows 3 cm behind vacuum point #2, open valve point #2;
22. At full infusion, close vacuum point #2;
23. Close vacuum point #1 when catalyst starts working and panel increases temperature of 35° C.
24. Keep vacuum on till resin fully cures;
25. Wait till panel temperature drops to room temperature;
26. De-mould.

TABLE 5 layer structure

| Layer | Weave | Lay up (°) | Surface (m²) |
|---|---|---|---|
| 1 | UNI 550 | | 1 |
| 2 | UNI 550 | 90 | 1 |
| 3 | UNI 550 | | 1 |
| 4 | UNI 550 | 90 | 1 |
| 5 | UNI 550 | | 1 |
| 6 | UNI 550 | 90 | 1 |
| 7 | UNI 550 | | 1 |
| 8 | UNI 550 | 90 | 1 |
| 9 | UNI 550 | | 1 |
| 10 | UNI 550 | 90 | 1 |
| 11 | UNI 550 | | 1 |
| 12 | UNI 550 | 90 | 1 |
| 13 | UNI 550 | | 1 |
| 14 | UNI 550 | 90 | 1 |
| 15 | UNI 550 | | 1 |
| 16 | UNI 550 | 90 | 1 |
| 17 | UNI 550 | | 1 |
| 18 | UNI 550 | 90 | 1 |
| 19 | UNI 550 | | 1 |
| 20 | UNI 550 | 90 | 1 |
| 21 | UNI 550 | | 1 |
| 22 | UNI 550 | 90 | 1 |
| 23 | UNI 550 | | 1 |
| 24 | UNI 550 | 90 | 1 |
| 25 | UNI 550 | | 1 |
| 26 | UNI 550 | 90 | 1 |
| 27 | UNI 550 | | 1 |
| 28 | UNI 550 | 90 | 1 |
| 29 | UNI 550 | | 1 |
| 30 | UNI 550 | 90 | 1 |
| 31 | UNI 550 | | 1 |
| 32 | UNI 550 | 90 | 1 |

The total weave and panel area was therefore 32 m². The total panel weight was 24.83 kg, made up of 17.60 kg fibres, 7.04 kg resin and 0.19 kg Perkadox.

A panel having a quasi-isotropic lay-up was also manufactured according to the above procedure having a layer structure according to Table 6.

TABLE 6 layer structure

| Layer | Weave | Lay up (°) | Surface (m²) - UNI | Surface (m²) - BI |
|---|---|---|---|---|
| 1 | UNI 550 | | 1 | |
| 2 | BI 300 | | | 1 |

TABLE 6-continued layer structure

| Layer | Weave | Lay up (°) | Surface (m²) - UNI | Surface (m²) - BI |
|---|---|---|---|---|
| 3 | UNI 550 | 90 | 1 | |
| 4 | BI 300 | | | 1 |
| 5 | UNI 550 | | 1 | |
| 6 | BI 300 | | | 1 |
| 7 | UNI 550 | 90 | 1 | |
| 8 | BI 300 | | | 1 |
| 9 | UNI 550 | | 1 | |
| 10 | BI 300 | | | 1 |
| 11 | UNI 550 | 90 | 1 | |
| 12 | BI 300 | | | 1 |
| 13 | UNI 550 | | 1 | |
| 14 | BI 300 | | | 1 |
| 15 | UNI 550 | 90 | 1 | |
| 16 | BI 300 | | | 1 |
| 17 | UNI 550 | | 1 | |
| 18 | BI 300 | | | 1 |
| 19 | UNI 550 | 90 | 1 | |
| 20 | BI 300 | | | 1 |
| 21 | UNI 550 | | 1 | |
| 22 | BI 300 | | | 1 |
| 23 | UNI 550 | 90 | 1 | |
| 24 | BI 300 | | | 1 |
| 25 | UNI 550 | | 1 | |
| 26 | BI 300 | | | 1 |
| 27 | UNI 550 | 90 | 1 | |
| 28 | BI 300 | | | 1 |
| 29 | UNI 550 | | 1 | |
| 30 | BI 300 | | | 1 |
| 31 | UNI 550 | 90 | 1 | |
| 32 | BI 300 | | | 1 |
| 33 | UNI 550 | | 1 | |
| 34 | BI 300 | | | 1 |
| 35 | UNI 550 | 90 | 1 | |
| 36 | BI 300 | | | 1 |
| 37 | UNI 550 | | 1 | |
| 38 | BI 300 | | | 1 |
| 39 | UNI 550 | 90 | 1 | |
| 40 | BI 300 | | | 1 |
| 41 | UNI 550 | | 1 | |
| 42 | BI 300 | | | 1 |
| 43 | UNI 550 | 90 | 1 | |

The total panel area was therefore 43 m², having 22 m² UNI and 21 m² BI. The total panel weight was 25.96 kg, made up of 18.40 kg fibres (12.10 kg UNI and 6.30 kg BI), 7.36 kg resin and 0.20 kg Perkadox.

Smaller panels having the same layer structures were also manufactured according to the above procedure, the layer structures being defined in Tables 7 and 8.

TABLE 7 layer structure

| Layer | Weave | Lay up (°) | Surface (m²) |
|---|---|---|---|
| 1 | UNI 550 | | 0.81 |
| 2 | UNI 550 | 90 | 0.81 |
| 3 | UNI 550 | | 0.81 |
| 4 | UNI 550 | 90 | 0.81 |
| 5 | UNI 550 | | 0.81 |
| 6 | UNI 550 | 90 | 0.81 |
| 7 | UNI 550 | | 0.81 |
| 8 | UNI 550 | 90 | 0.81 |
| 9 | UNI 550 | | 0.81 |
| 10 | UNI 550 | 90 | 0.81 |
| 11 | UNI 550 | | 0.81 |
| 12 | UNI 550 | 90 | 0.81 |
| 13 | UNI 550 | | 0.81 |
| 14 | UNI 550 | 90 | 0.81 |
| 15 | UNI 550 | | 0.81 |

TABLE 7-continued

| | | layer structure | |
|---|---|---|---|
| Layer | Weave | Lay up (°) | Surface (m²) |
| 16 | UNI 550 | 90 | 0.81 |
| 17 | UNI 550 | | 0.81 |
| 18 | UNI 550 | 90 | 0.81 |
| 19 | UNI 550 | | 0.81 |
| 20 | UNI 550 | 90 | 0.81 |
| 21 | UNI 550 | | 0.81 |
| 22 | UNI 550 | 90 | 0.81 |
| 23 | UNI 550 | | 0.81 |
| 24 | UNI 550 | 90 | 0.81 |
| 25 | UNI 550 | | 0.81 |
| 26 | UNI 550 | 90 | 0.81 |
| 27 | UNI 550 | | 0.81 |
| 28 | UNI 550 | 90 | 0.81 |
| 29 | UNI 550 | | 0.81 |
| 30 | UNI 550 | 90 | 0.81 |
| 31 | UNI 550 | | 0.81 |
| 32 | UNI 550 | 90 | 0.81 |

The total weave and panel area was therefore 25.92 m². The total panel weight was 18.90 kg, made up of 14.26 kg fibres and 4.64 kg resin. The resin to fibre ratio was therefore 32.54% and the panel thickness was 12.12 mm.

TABLE 8

| | | | layer structure | |
|---|---|---|---|---|
| Layer | Weave | Lay up (°) | Surface (m²) - UNI | Surface (m²) - BI |
| 1 | UNI 550 | | 0.81 | |
| 2 | BI 300 | | | 0.81 |
| 3 | UNI 550 | 90 | 0.81 | |
| 4 | BI 300 | | | 0.81 |
| 5 | UNI 550 | | 0.81 | |
| 6 | BI 300 | | | 0.81 |
| 7 | UNI 550 | 90 | 0.81 | |
| 8 | BI 300 | | | 0.81 |
| 9 | UNI 550 | | 0.81 | |
| 10 | BI 300 | | | 0.81 |
| 11 | UNI 550 | 90 | 0.81 | |
| 12 | BI 300 | | | 0.81 |
| 13 | UNI 550 | | 0.81 | |
| 14 | BI 300 | | | 0.81 |
| 15 | UNI 550 | 90 | 0.81 | |
| 16 | BI 300 | | | 0.81 |
| 17 | UNI 550 | | 0.81 | |
| 18 | BI 300 | | | 0.81 |
| 19 | UNI 550 | 90 | 0.81 | |
| 20 | BI 300 | | | 0.81 |
| 21 | UNI 550 | | 0.81 | |
| 22 | BI 300 | | | 0.81 |
| 23 | UNI 550 | 90 | 0.81 | |
| 24 | BI 300 | | | 0.81 |
| 25 | UNI 550 | | 0.81 | |
| 26 | BI 300 | | | 0.81 |
| 27 | UNI 550 | 90 | 0.81 | |
| 28 | BI 300 | | | 0.81 |
| 29 | UNI 550 | | 0.81 | |
| 30 | BI 300 | | | 0.81 |
| 31 | UNI 550 | 90 | 0.81 | |
| 32 | BI 300 | | | 0.81 |
| 33 | UNI 550 | | 0.81 | |
| 34 | BI 300 | | | 0.81 |
| 35 | UNI 550 | 90 | 0.81 | |
| 36 | BI 300 | | | 0.81 |
| 37 | UNI 550 | | 0.81 | |
| 38 | BI 300 | | | 0.81 |
| 39 | UNI 550 | 90 | 0.81 | |
| 40 | BI 300 | | | 0.81 |
| 41 | UNI 550 | | 0.81 | |
| 42 | BI 300 | | | 0.81 |
| 43 | UNI 550 | 90 | 0.81 | |

The total weave and panel area was therefore 34.83 m², having 17.82 m² UNI and 17.01 m² BI. The total panel weight was 20.70 kg, made up of 14.90 kg fibres and 5.80 kg resin. The resin to fibre ratio was therefore 38.93% and the panel thickness was 13.20 mm.

The panels were subjected to armour protection ballistic resistance testing (NU-STD-0108.01 levels III and IIIA) and passed.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a structural shell, the structural shell comprising a basalt fibre-reinforced material, wherein the basalt fibre-reinforced material comprises a polymer material, the polymer material being capable of at least partially thermally cracking at a temperature of from 200 to 600° C., and wherein the polymer material comprises a polymethacrylate, the method comprising:
   providing a mould;
   introducing basalt fibres into the mould;
   contacting the basalt fibres with a mixture comprising a resin, the resin comprising methacrylate monomers, and a hardening agent at a relative pressure of −0.65 bar or less to form a structural shell; and
   recovering the structural shell from the mould;
   wherein the method further comprises introducing a polymer core, a balsa core, or aluminium core into the mould prior to contacting the basalt fibres with the mixture.

2. The structural shell of claim 1, wherein the polymer material is a thermoplastic material.

3. The method of claim 1, wherein the polymer material comprises a poly(methyl methacrylate).

4. The method of claim 1, wherein the polymer material is capable of at least partially melting at a temperature of from 150 to 300° C. and/or wherein the polymer material is capable of at least partially melting at a lower temperature than it is capable of at least partially thermally cracking.

5. The method of claim 1, wherein the polymer material is capable of at least partially thermally cracking at a temperature of from 300 to 500° C., wherein the at least partially thermally cracked polymer material is a liquid at 20° C.

6. The method of claim 1, wherein the ratio by weight of basalt fibres to polymer material is from 80:20 to 40:60.

7. The method of claim 1, wherein basalt fibres are dispersed in the polymer material in a regular arrangement, wherein the basalt fibre-reinforced material comprises a plurality of layers of substantially parallel basalt fibres, wherein the average direction of the substantially parallel basalt fibres is different in adjacent layers.

8. The method of claim 1 further comprising a gelcoat, wherein the gelcoat comprises unsaturated polyester resins and/or vinyl resins.

9. The method of claim 1, wherein the resin comprises from 50 to 85 wt. % methyl methacrylate monomers and/or from 10 to 50 wt. % acrylic polymers.

10. The method of claim 1, wherein the hardening agent comprises an organic peroxide, wherein the mixture comprises the hardening agent in an amount of from 0.5 to 30 phr.

11. The method of claim 1, wherein the method further comprises forming a gelcoat in the mould prior to the introduction of the basalt fibres into the mould.

12. A method of manufacturing an object comprising a structural shell; the method comprising the method of manufacturing the structural shell of claim 1, wherein the object is selected from the group consisting of a hull for a marine vessel, a structural grid for a marine vessel, a deck for a marine vessel, a marine vessel comprising at least one hull and/or at least one structural grid and/or at least one deck, a wind turbine blade, a ski or ski pole, a ballistic resistant panel, an automotive structure or body part, and a train, tramway or metro component.

13. The method of claim 1, further comprising a polymer core.

14. The method of claim 13, wherein the polymer core has a melting temperature of from 200 to 300° C.

15. The method of claim 13, wherein the polymer core comprises a polyester.

16. The method of claim 15, wherein the polyester comprises PET.

* * * * *